US008443143B2

(12) United States Patent
Otsuka

(10) Patent No.: US 8,443,143 B2
(45) Date of Patent: May 14, 2013

(54) INFORMATION PROCESSING APPARATUS CONNECTED TO A NETWORK AND CONTROL METHOD FOR THE SAME

(75) Inventor: Kuniaki Otsuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 906 days.

(21) Appl. No.: 12/036,755

(22) Filed: Feb. 25, 2008

(65) Prior Publication Data

US 2009/0006747 A1   Jan. 1, 2009

(30) Foreign Application Priority Data

Feb. 26, 2007   (JP) ................................. 2007-046294

(51) Int. Cl.
*G06F 12/00* (2006.01)
(52) U.S. Cl.
USPC .............................................. 711/115; 726/9
(58) Field of Classification Search .................. None
See application file for complete search history.

(56) References Cited

U.S. PATENT DOCUMENTS

| | | | | |
|---|---|---|---|---|
| 6,202,156 B1 * | 3/2001 | Kalajan | ........................... | 726/11 |
| 6,606,707 B1 * | 8/2003 | Hirota et al. | .................. | 713/172 |
| 6,891,634 B1 * | 5/2005 | Nihei | ........................... | 358/1.15 |
| 7,290,144 B1 * | 10/2007 | Kitaj et al. | .................... | 713/182 |
| 7,805,563 B2 * | 9/2010 | Topham | ......................... | 711/111 |
| 7,872,786 B2 * | 1/2011 | Hoshino | ........................ | 358/540 |
| 2003/0041085 A1 * | 2/2003 | Sato | .............................. | 709/100 |
| 2003/0065952 A1 * | 4/2003 | Otsuka | ........................... | 713/201 |
| 2003/0099456 A1 * | 5/2003 | Ohmura et al. | .................. | 386/46 |
| 2004/0083401 A1 * | 4/2004 | Furukawa et al. | ................. | 714/7 |
| 2004/0181629 A1 * | 9/2004 | Higuchi | ......................... | 711/115 |
| 2004/0212735 A1 * | 10/2004 | Kitamura | ........................ | 348/553 |
| 2005/0160276 A1 * | 7/2005 | Braun et al. | ................... | 713/185 |
| 2005/0206353 A1 * | 9/2005 | Sengoku | ........................ | 323/210 |
| 2006/0045272 A1 * | 3/2006 | Ohaka | ............................ | 380/270 |
| 2006/0149911 A1 * | 7/2006 | Kimelman et al. | ........... | 711/163 |
| 2006/0176497 A1 * | 8/2006 | Kimura et al. | ................ | 358/1.13 |
| 2006/0288304 A1 * | 12/2006 | Nomoto et al. | ................ | 715/781 |
| 2007/0253384 A1 * | 11/2007 | Kanagala et al. | ............. | 370/338 |
| 2009/0153886 A1 * | 6/2009 | Nagasawa et al. | ............. | 358/1.9 |

FOREIGN PATENT DOCUMENTS

| JP | 11219320 A | 8/1999 |
|---|---|---|
| JP | 200114441 A | 1/2001 |
| JP | 200369573 A | 3/2003 |
| JP | 2003110551 A | 4/2003 |
| JP | 2003223307 A | 8/2003 |
| JP | 2006-065829 A | 3/2006 |
| JP | 2006-168261 A | 6/2006 |
| JP | 2006-172351 A | 6/2006 |

* cited by examiner

*Primary Examiner* — Edward Dudek, Jr.
*Assistant Examiner* — Sean D Rossiter
(74) *Attorney, Agent, or Firm* — Canon USA Inc IP Division

(57) ABSTRACT

An information processing apparatus capable of connecting to a plurality of terminal devices over a network includes a recording/reproducing unit configured to receive a removable memory medium, a detector configured to detect insertion and removal of the removable memory medium in and from the recording/reproducing unit, and a controller configured to acquire first information identifying a terminal device which is recorded in the removable memory medium when the detector detects the insertion of the removable memory medium and to control permission and prohibition of access to the removable memory medium from the terminal devices based on the first information.

8 Claims, 10 Drawing Sheets

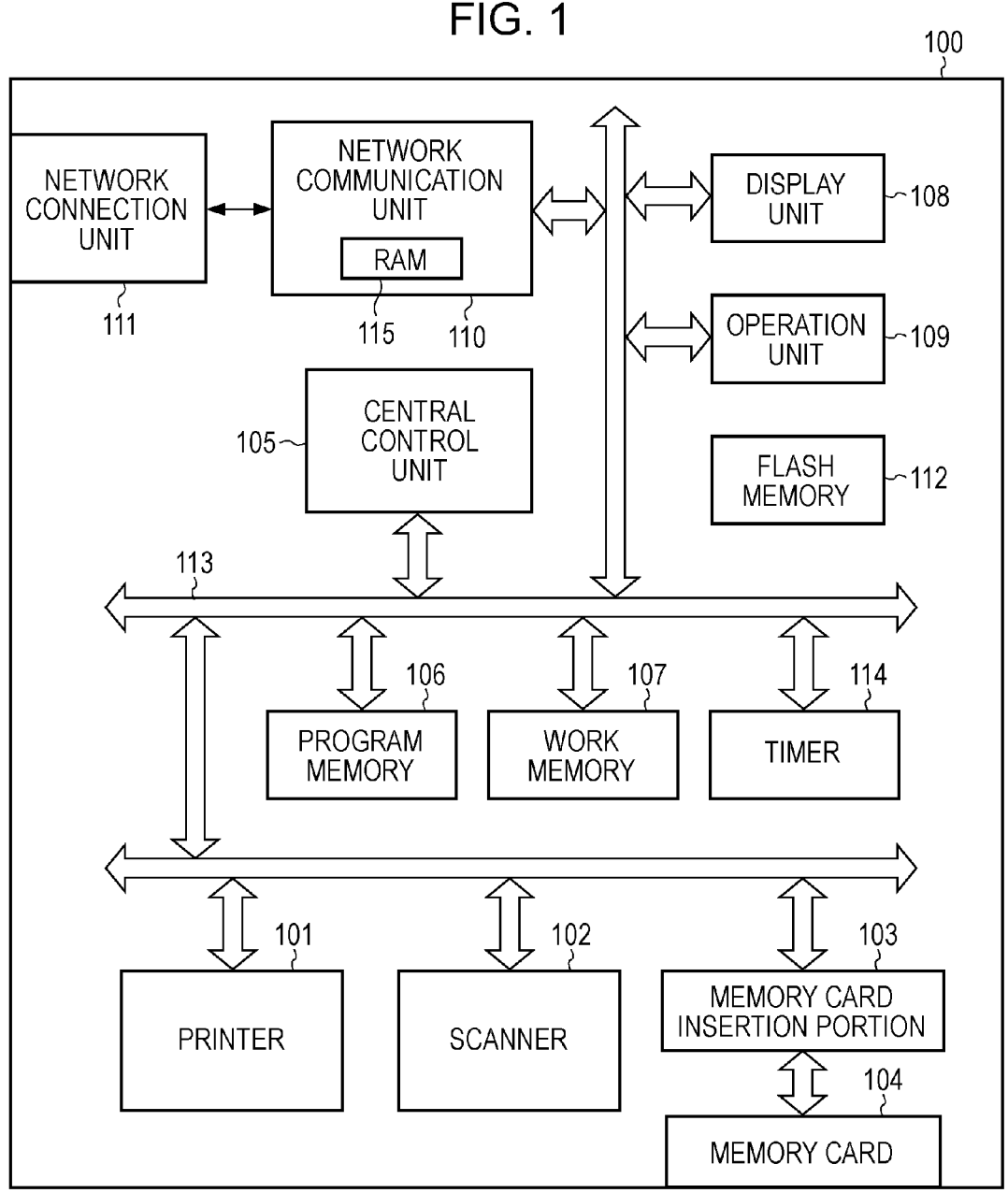

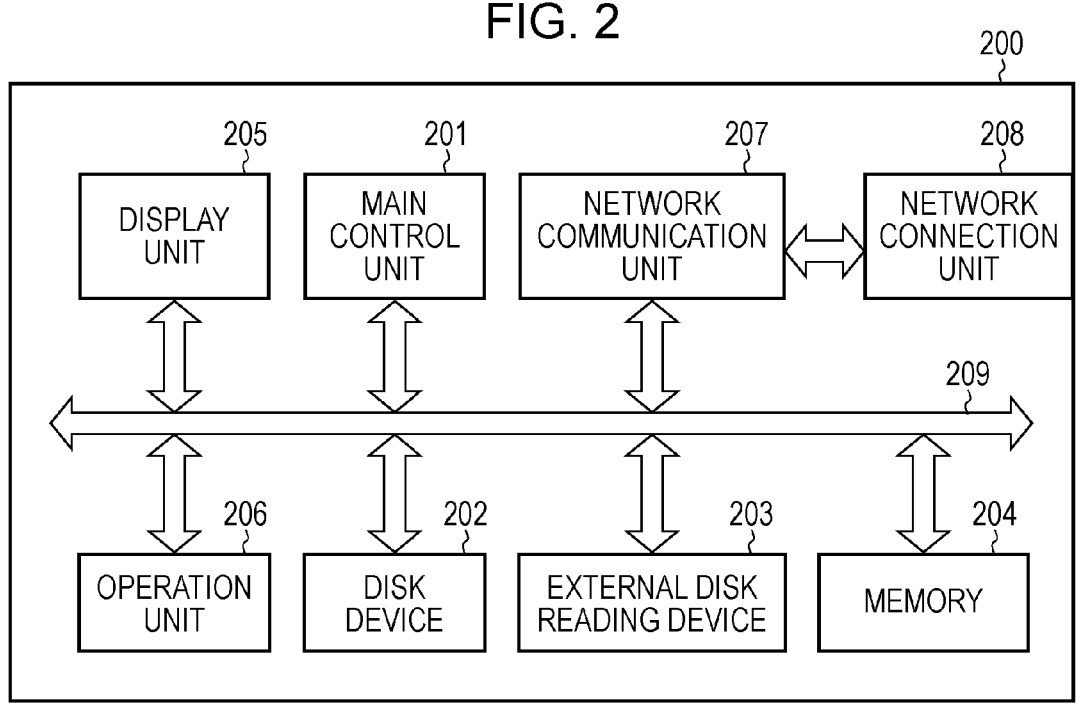
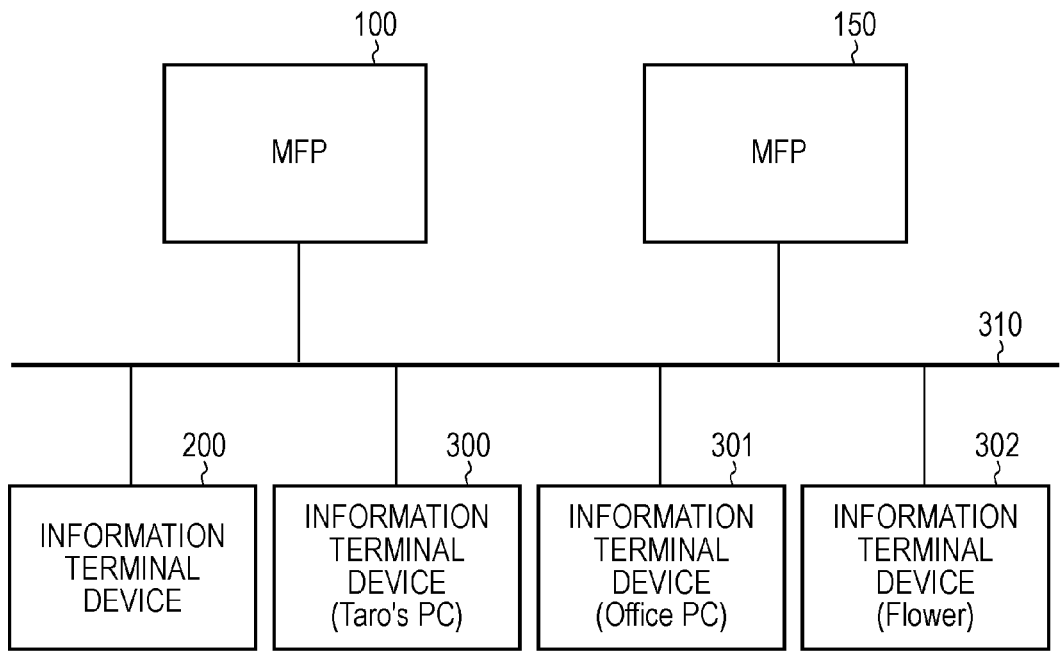

| LOGIN NAME@COMPUTER NAME | IP ADDRESS |
|---|---|
| admin@Taro'sPC | 192.168.1.101 |
| user1@officePC | 192.168.1.102 |
| user2@officePC | 192.168.1.102 |
| Hanako@Flower | 192.168.1.103 |
| | |
| | |
| | |
| | |
| | |

INFORMATION PROCESSING APPARATUS CONNECTED TO A NETWORK AND CONTROL METHOD FOR THE SAME

BACKGROUND OF THE INVENTION

1. Field of the Invention

The present invention relates to peripheral devices for restricting access from terminal devices connected via networks and access control methods for the peripheral devices.

2. Description of the Related Art

Recently, along with the diversification of peripheral devices, so-called multi function peripherals (MFP) having printer functions, scanner functions, copier functions, etc., have been developed. There are MFPs which have means for inserting memory cards to print images of image files stored in the memory card by the printer functions. There are also MFPs allowing computers (hereinafter referred to as PCs) connected thereto to read files stored in memory cards inserted in the MFPs and edit the read files.

In addition, it has become possible that an MFP and a plurality of PCs are connected to the same network so that the PCs can receive service provided through various functions of the MFP. That is, one MFP can be shared by a plurality of PCs over a network.

While sharing of an MFP among a plurality of PCs over a network increases convenience, in such an environment, however, it is likely that confidential information is also shared. To address this security concern, a technique for providing an access restriction function and an authentication function may be employed.

For example, Japanese Patent Laid-Open No. 2003-discloses a system in which an authentication device having authentication capability is connected to an MFP. In this authentication device, identification information for identifying PCs are displayed on a display based on the device addresses sent from individual PCs over a network. Then, when an administrator of the MFP selects one of the PC to be permitted to receive a predetermined service based on the displayed identification information, the device address corresponding to the identification information of the selected PC is sent to a service providing device for controlling provision of the services of the MFP. In this service providing device, the device address sent from the authentication device is stored, and when this device address matches a device address sent from a PC, a service request is permitted and this PC is registered in the service providing device.

This system allows the administrator of the MFP to arbitrarily register a PC to be permitted for communication and service requests without manually performing complicated operations such as registration of MAC addresses, and thus realizes an address restriction function and a MAC address filtering function.

In addition, Japanese Patent Laid-Open No. 2003-69573, for example, discloses a technique in which a memory card storing predetermined information is inserted in a PC connected to a network so that the PC is operable in the network.

Japanese Patent Laid-Open No. 2003-223307, for example, proposes a technique in which an access restriction function is provided in a copying machine, and when the copying machine receives an access request from a PC connected to a network, the access limiting function extracts an IP address and a MAC address for identifying the source of the access request and checks if the IP address and MAC address match addresses stored in an external storage unit or the like. In accordance with the checking result, the PC is permitted for network operations.

Moreover, in view of copyright protection, a technique has been proposed for controlling types of an access operation such as copying and storing of multimedia information to be accessed, in a data recording/reproducing system for multimedia information. Specifically, as disclosed in Japanese Patent Laid-Open No. H11-219320, for example, based on the identification information identifying the source of data to be accessed and access control information containing access information specifying the type of access to the data, which are set in an external device or the like, the type of access to the data is controlled.

Furthermore, a technique has been proposed for realizing authentication for access to a memory card by providing the memory card with a control IC, a flash memory, and a ROM storing the following information. Specifically, as disclosed in Japanese Patent Laid-Open No. 2001-14441, the ROM stores a medium ID unique to the memory card and the flash memory includes an authentication area for permitting access from an external device only when the authentication of the external device is successful and a non-authentication area for permitting access regardless of authentication results. The control IC has a control unit controlling access from external devices to the authentication area and the non-authentication area, an authentication unit executing mutual authentication with the external devices, etc.

According to the technique disclosed in Japanese Patent Laid-Open No. 2003-110551, a terminal to be permitted to use all services provided by an MFP can be set. However, the technique does not allow setting or control of access permission for each service or function of the MFP.

In addition, according to the technique disclosed in Japanese Patent Laid-Open No. 2003-69573, only a network terminal having inserted therein a card storing predetermined information is operable in a network system, and access to the network terminal from other network terminal devices is not restricted.

Further, in the technique disclosed in Japanese Patent Laid-Open No. 2003-223307, when an external storage device, such as a memory card, is inserted in a copying machine, only a terminal having an address identical to an address registered in the eternal storage device can be permitted for network operations on the copying machine. However, this technique does not take into account information other than the address information stored in the external storage device and protection of the stored information.

Moreover, the technique disclosed in Japanese Patent Laid-Open No. H11-219320 allows access operations corresponding to the content of copyright of multimedia information and consequently realizes a protection function effective for the copyright. However, the technique does not control permission and prohibition of access operations for each terminal device. Specifically, the technique can realize only control as to whether copying of information to be accessed is permitted or only reading of the information is permitted and does not perform access control particularly in accordance with individual information terminals connected to a network.

Furthermore, according to the memory card disclosed in Japanese Patent Laid-Open No. 2001-14441, while a file stored in the non-authentication area is unprotected and can be freely accessed, a file stored in the authentication area is secured since it can be accessed only from devices that have been successfully authenticated. However, when this memory card is inserted in an external device connected to a network, terminal devices connected to the same network may be permitted to access the authentication area only if the terminal devices are successfully authenticated. In addition, the technique does not take into account whether other network terminals access the external device with the memory card inserted therein.

As described above, a memory card inserted in an MFP connected to a network conveniently enables access from an arbitrary information terminal device such as a PC over the network. However, such a memory card has a security problem. Specifically, in the use of the memory card, it is likely that a file in the memory card is read by an unexpected user, that a file desired to be saved is edited, copied, or even worse, deleted. In particular, since a memory card often stores images captured by a digital camera and corresponding additional information, it is of a great concern that the stored information is viewed or edited by unexpected users.

Thus, it is desirable that access to a memory card storing image data is permitted to only a specific user. However, if the memory card is not inserted in a peripheral device, the printing function described above may not be effectively used. In addition, if access to the memory card having no file stored therein is strictly restricted, the advantage of inserting the memory card in the peripheral device connected to a network is degraded.

Moreover, it is convenient that various service functions of an MFP connected to a network can be used by PCs, etc. connected to the same network. However, for example, the use of the printer function of the MFP by unintended users results in a significant increase in consumption of printer supplies such as printing sheets and ink. Further, a document placed on an original plate of the MFP or a scanned document left on the original plate may be scanned by an unintended user using the scanner function accessed via the network.

Although the access restriction functions for MFPs have been proposed as described above, the access restriction function may be changed without permission even after it is appropriately set.

SUMMARY OF THE INVENTION

According to an exemplary embodiment of the present invention, an information processing apparatus connected to a network capable of connecting a plurality of terminal devices includes a recording/reproducing unit configured to receive a removable memory medium, a detector configured to detect insertion and removal of the removal memory medium in and from the recording/reproducing unit, and a controller configured to acquire first information identifying at least one terminal device which is recorded in the removable memory medium when the detector detects insertion of the removal memory medium and to control permission and prohibition of access to the removable memory medium from the at least one terminal device based on the first information.

According to an exemplary embodiment of the present invention, an information processing apparatus connected to a network capable of connecting a plurality of terminal devices includes a recording/reproducing unit configured to receive a removable memory medium, a detector configured to detect insertion and removal of the removal memory medium in and from the recording/reproducing unit, a history memory configured to store information on a at least one terminal device that has accessed the information processing apparatus via the network, a display, an operation input unit, and a controller configured to perform control so that information stored in the history memory is displayed on the display when the detector detects insertion of the removable memory medium, so that at least one terminal device is selected in response to input from the operation input unit, and so that access to the removable memory medium from the selected terminal device is permitted.

Further features of the present invention will become apparent from the following description of exemplary embodiments (with reference to the attached drawings).

BRIEF DESCRIPTION OF THE DRAWINGS

FIG. 1 is a block diagram schematically illustrating an MFP according to a first exemplary embodiment of the present invention.

FIG. 2 is a block diagram schematically illustrating an information terminal device according to the first exemplary embodiment.

FIG. 3 is a block diagram schematically illustrating a communication system according to the first exemplary embodiment.

DETAILED DESCRIPTION OF THE EXEMPLARY EMBODIMENTS

Figure 4:
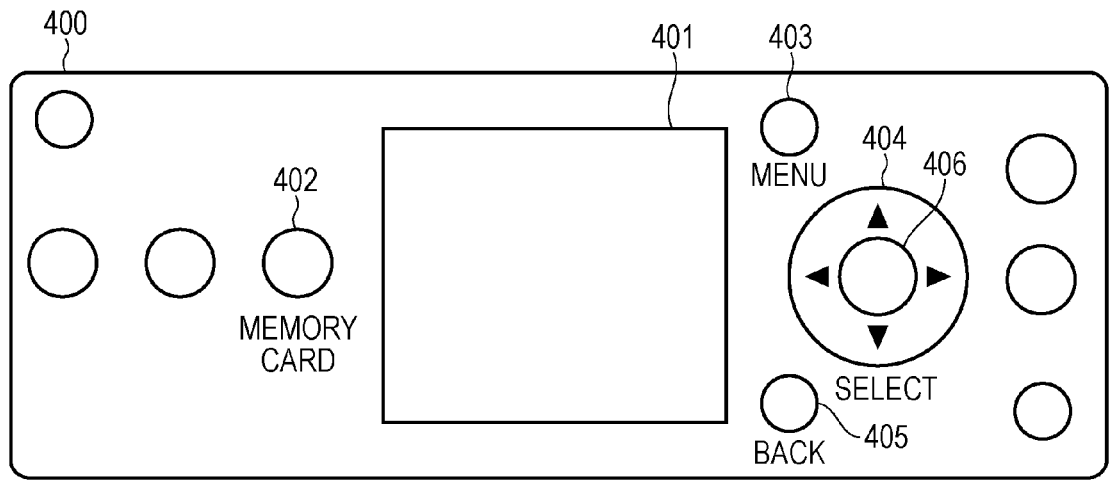
FIG. 4 illustrates a configuration of an operation panel of an MFP according to the first exemplary embodiment.

In the following, the present invention will be described in detail by way of preferred embodiments thereof with reference to the accompanying drawings. It should be understood that arrangements illustrated in the following exemplary embodiments are merely illustrative, and the present invention is intended not to be limited thereto.

—Apparatus Configuration—

FIG. 1 is a block diagram schematically illustrating a multifunction peripheral (MFP) according to a first exemplary embodiment. An MFP 100 has a printer function by a printer 101, a scanner function by a scanner 102, and a storage function by a memory card 104 or the like. The MFP 100 is capable of providing functional services via a network.

In the MFP 100, the memory card 104 can be inserted and removed in and from a memory card insertion portion 103. The memory card insertion portion 103 serves as a memory card insertion/removal section and a memory card insertion/removal detection section. The insertion of the memory card 104 in the MFP 100 enables an external device connected to the MFP 100 via a network to read and edit files stored in the memory card 104 and store files in the memory card 104.

In the MFP 100, a central control unit 105 controls individual components of the MFP 100, and a program memory 106, such as a ROM, stores program code, etc. to be read by the central control unit 105. In addition, a work memory 107, such as a RAM, temporarily stores or buffers image data or the like in execution of each service.

The MFP 100 also includes a display unit 108 composed of a liquid crystal panel, an operation unit 109 composed of various switches described below, a network communication unit 110, a network connection unit 111, and a flash memory 112. The network communication unit 110 connects the MFP 100 to a network to perform various types of communication. The network connection unit 111 connects the network communication unit 110 to a network medium. The network communication unit 110 may be compatible with a wired LAN or a wireless LAN. The flash memory 112 stores transmission source information of packets received by the network communication unit 110.

In addition, the MFP 100 has a signal line 113, a timer 114, and a RAM 115. The signal line 113 interconnects the individual components constituting the MFP 100. The timer 114 is capable of measuring a time period set by the central control unit 105. When the set time period elapses, the timer 114 notifies the central control unit 105 of the time elapse by an interrupt signal, etc. The RAM 115 is included in the network communication unit 110 and allows a control unit (not shown) provided in the network communication unit 110 to perform reading and writing of information.

FIG. 2 is a block diagram schematically illustrating an information terminal device connected to the same network as the MFP 100 described above.

An information terminal device 200, such as a personal computer, as illustrated in FIG. 2 includes a main control unit 201, a disk device 202, an external disk reading device 203, a memory 204, a display unit 205 composed of a liquid crystal display or the like, an operation unit 206 composed of a keyboard, a mouse, etc., a network communication unit 207, a network connection unit 208, and a signal line 209.

The main control unit 201 controls individual components provided in the information terminal device 200. The disk device 202 is installed with a program, such as an application program or an operating system (OS), to be read out by the main control unit 201 and is used for storing files. The external disk reading device 203 reads the content of an external storage device, such as a CD-ROM. The memory 204 allows the main control unit 201 to temporarily store or buffer data. The network communication unit 207 allows the information terminal device 200 to connect to a network and perform various types of communication. The network connection unit 208 connects the network communication unit 207 to a network medium. The signal line 209 interconnects the individual components constituting the information terminal device 200.

Similarly to the case of the MFP 100, the network communication unit 207 and the network connection unit 208 may be compatible with either a wired LAN or a wireless LAN and employs necessary functions and configurations in accordance with a medium to be connected.

In the present embodiment, the MFP 100 and the information terminal device 200 described above are connected over the same network capable of connecting a plurality of terminal devices. FIG. 3 illustrates an example of a system configuration according to the present embodiment. As illustrated in the FIG. 3, the MFP 100, an MFP 150, the information terminal device 200, and information terminal devices 300, 301, and 302 are connected over a network 310. The MFP 150 has functions similar to those of the MFP 100 illustrated in FIG. 1, and the information terminal devices 300, 301, and 302 have functions similar to those of the information terminal device 200 illustrated in FIG. 2.

In FIG. 3, while the network 310 appears to be a wired LAN, it may be a wireless LAN. In addition, FIG. 3 illustrates an example in which four information terminal devices are connected to the network 310. However, the information terminal device 200 alone or two or more information terminal devices can constitute the system. Further, it is also possible that an MFP other than the MFP 100 and the MFP 150 is connected to the network 310.

FIG. 4 schematically illustrates an operation panel 400 which constitutes the display unit 108 and the operation unit 109 of the MFP 100 illustrated in FIG. 1. In FIG. 4, the operation panel 400 has a liquid crystal display 401 constituting the display unit 108 and a button group including buttons 402 to 406 which serves as a key operation portion constituting the operation unit 109 which is operated by a user.

The key operation portion includes a memory card key 402 used for initiating a service such as printing (hereinafter referred to as memory card printing) and display of image files, etc. stored in the memory card 104 inserted in the MFP 100. The key operation portion also includes a menu key 403, an arrow key 404, a back key 405, and a select key 406. The menu key 403 is pressed to display various setting items of the MFP 100. The arrow key 404 is pressed to move up, down, left, and right a cursor on the liquid crystal display 401 to search for a menu to be set and a file in the memory card 104 which is to be processed. The back button 405 is pressed to change a menu display back to the previous display, for example. The select key 406 is pressed to select an item indicated by the cursor on the liquid crystal display 401.

—Memory Card Configuration—

Figure 5:
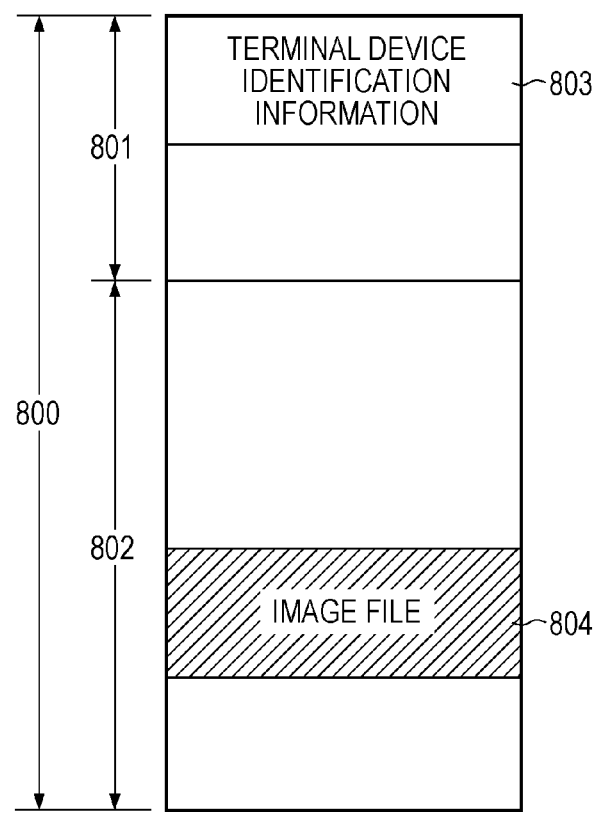
FIG. 5 conceptually illustrates storage areas of a memory card according to the first exemplary embodiment.

FIG. 5 illustrates storage areas in the memory card 104 in the present embodiment. In FIG. 5, an entire memory card area 800 is divided into a specific area 801 and a non-specific area 802. The non-specific area 802 is generally used and stores files such as an image file 804. For example, when the memory card 104 is inserted in a digital camera, image data of a captured image is stored in the non-specific area 802 as the image file 804.

On the other hand, the specific area 801 is permitted to write data only in a specific manner. In the specific area 801, terminal device identification information 803 such as an MAC address of an information terminal device permitted to access the memory card 104 is written beforehand in the specific manner. This terminal device identification information 803 is acquired by an identification information acquiring section in the MFP 100 and used as identification information for identifying a terminal device permitted to access the memory card 104.

—Access Control to Memory Card—

In the network system of the present embodiment having the above configuration, the memory card 104 inserted in the MFP 100 can be accessed by the information terminal device 200 connected over the same network. However, in the present embodiment, access from the information terminal device 200 to the memory card 104 of the MFP 100 is not unconditionally permitted.

Figure 6:
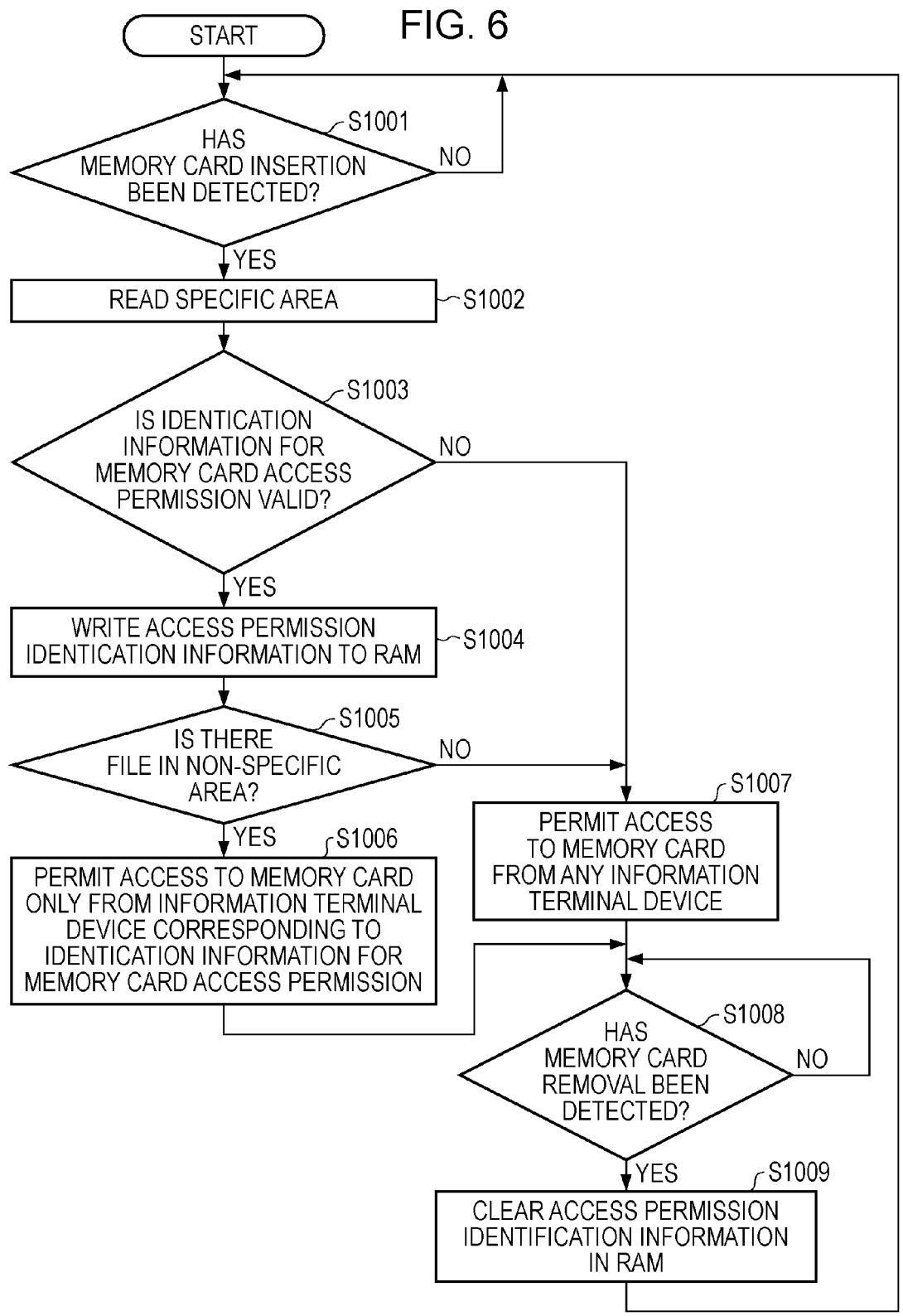
FIG. 6 is a flowchart illustrating a processing procedure of access control to a memory card according to the first exemplary embodiment.

FIG. 6 is a flowchart illustrating a processing procedure of access control applied to the memory card 104 according to the present embodiment.

When the memory card insertion portion 103 of the MFP 100 detects that the memory card 104 has been inserted at step S1001, the memory card insertion portion 103 notifies the central control unit 105 of the insertion. At step S1002, the central control unit 105 reads data in the specific area 801 of the memory card 104 via the memory card insertion portion 103. At step S1003, the central control unit 105 determines whether the terminal device identification information 803 is valid.

When it is determined that the terminal device identification information 803 is valid (YES, in step S1003), the terminal device identification information 803 is written to a first predetermined area of the RAM 115 built in the network communication unit 110 at step S1004 to be used as access control information. Then, at step S1005, it is determined whether any file is stored in the non-specific area 802 of the memory card 104.

When it is determined that a file is stored in the non-specific area 802 (YES, in step S1005), an access-permitted terminal is determined based on the terminal device identification information 803 stored in the first predetermined area of the RAM 115. Specifically, at step S1006, the network communication unit 110 performs control so that only a terminal device corresponding to the identification information contained in the terminal device identification information 803 is permitted to access the memory card 104.

More specifically, transmission source information of received packets is compared with the terminal device identification information 803 stored in the first predetermined area of the RAM 115. Note that if the access speed to the memory card 104 is sufficiently high to the extent that it is not less than the access speed to the RAM 115, it is not necessary to write the terminal device identification information 803 to the RAM 115 to perform the above comparison.

On the other hand, if it is determined that the terminal device identification information 803 is not valid (NO, in step S1003), any information terminal device connected over the network 310 is permitted to access the memory card at step S1007. Similarly, if no file is stored in the non-specific area 802 (NO, in step S1005), any information terminal device is permitted to access the memory card 104. This is because it has been determined that no information based on which access to the non-specific area of the memory card 104 or no file to be protected is not present.

If removal of the memory card 104 is detected in the memory card insertion portion 103 (YES in step S1008), the first predetermined area of the RAM 115 is cleared at step S1109. Thus, the MFP 100 is returned to the state it was in before the memory card 104 was inserted.

With this clearing of the first predetermined area, if the memory card 104 removed from the MFP 100 is inserted in the MFP 150, processing similar to the above-described processing illustrated in the flowchart of FIG. 6 is executed. That is, when the memory card 104 is moved from the MFP 100 to the MFP 150, the access restriction applied to the MFP 100 is similarly applied to the MFP 150. If more than one memory card storing the same information as stored in the specific area 801 of the memory card 104 is provided, these memory cards can be inserted in the MFP 100 and the MFP 150 so that the same access restriction is automatically applied to the both the MFP 110 and MFP 150. Thus, according to the present embodiment, the access restriction described above is applied only while the memory card 104 is inserted in the MFP 100. In addition, when the memory card 104 is removed from the MFP 100 and inserted to another peripheral device, the similar access control is performed in the peripheral device.

As described above, according to the access control in the present embodiment, access restriction is applied when one or more files are stored in the non-specific area 802 of the memory card 104 and the terminal device identification information 803 is valid. Specifically, an information terminal device whose identification information is contained in the terminal device identification information 803 is permitted to access the memory card 104, and an information terminal device whose identification information is not contained in the terminal device identification information 803 is prohibited from accessing to the memory card 104.

Note that enabling access to the memory card 104 means enabling access to the non-specific area 802 of the memory card 104. As described above, the specific area 801 of the memory card 104 is a special area to which writing of data is allowed only in a specific manner. In the specific area 801, the terminal device identification information 803 of an information terminal device that is permitted to access to the memory card 104 has stored beforehand. Thus, even an information terminal device corresponding to the identification information contained in the terminal device identification information 803 may not be permitted to access the specific area 801 of the memory card 104, and thus the terminal device identification information 803 is not changed.

In the processing of step S1001, the determination of insertion detection of the memory card 104 is performed as described above. However, in step S1001, it is also possible to determine whether the power of the MFP 100 has been turned on with the memory card 104 inserted therein.

Validity Determination of Terminal Device Identification Information—

The validity/invalidity determination of the terminal device identification information 803, which is performed in step S1003 described above, will now be described using some examples.

If no identification information is contained in the terminal device identification information 803, the terminal device identification information 803 is determined to be invalid. On the other hand, if at least one piece of identification information is contained, the terminal device identification information 803 is determined to be valid if no invalid address which is not to be allocated to one device is contained or if an address other than the invalid address is contained.

An example of such an invalid address may be "FF:FF:FF:FF:FF" in the case of an MAC address. If identification information is an IP address, an invalid address may be "0.0.0.0" or "255.255.255.255". In addition, if terminal device identification information 803 contains only invalid addresses or contains at least one invalid address, the terminal device identification information 803 may be determined to be invalid.

Moreover, in the above determination processing, if the identification information is an IP address, it may be determined whether the IP address corresponds to the network address of an IP address set in the MFP 100. A network address herein refers to a portion of a bit string constituting an IP address which is used, for example, for identifying a subnet used by the network 310. Thus, the network address can be obtained by ANDing the IP address set in the MFP 100 and a corresponding subnet mask.

In the foregoing, the terminal device identification information 803 has been described as identification information of an information terminal device to be permitted to access the memory card 104. It is also possible that access to the memory card 104 is categorized as "reading" and "reading and writing". Specifically, the terminal device identification information 803 may contain the identification information of an information terminal device permitted only to read data in the non-specific area 802 and the identification information of an information terminal device permitted to read and write data from and to the non-specific area 802.

In this case, access control can be flexibly performed depending on the type of access permission of an information terminal device attempting to access the memory card 104 in the processing of step S1006 in FIG. 6. Specifically, the central control unit 105 performs access control based on the cases where only reading of the non-specific area 802 is permitted, where both reading and writing of the non-specific area 802 are permitted, and where neither reading nor writing is permitted.

In the above description, the terminal device identification information 803 is stored in the first predetermined area within the RAM 115. However, a work memory 107 may be used instead of the RAM 115 to store the terminal device identification information 803.

As described above, according to the present embodiment, information on a terminal device permitted to access the memory card 104 inserted in the MFP 100 is stored beforehand in the memory card 104, and most appropriate access control is executed using the stored information. Since this access control is based on information stored in a memory card, access restriction is effective for every peripheral device with the memory card inserted therein. In addition, according to this access control, it is not necessary to perform setting of access restriction to each peripheral device, and the access restriction function is automatically applied to an intended peripheral device. Further, the access restriction described above is applied to a peripheral device only while a memory card is inserted in the peripheral device. Thus, even when the memory card is removed and inserted to another peripheral device, similar access control can be applied to the other peripheral device.

In the following, a second exemplary embodiment of the present invention will be described. The second exemplary embodiment employs a system configuration similar to that employed in the first exemplary embodiment, and thus the description thereof will be omitted. In the first exemplary embodiment described above, access to a memory card is controlled based on terminal device identification information stored beforehand in a specific area in the memory card. In the present embodiment, information identifying an information terminal device permitted to use all services provided by an MFP is stored in a specific area in a memory card as apparatus access permission information, and access control based on the information is performed.

—Memory Card Configuration—

Figure 7:
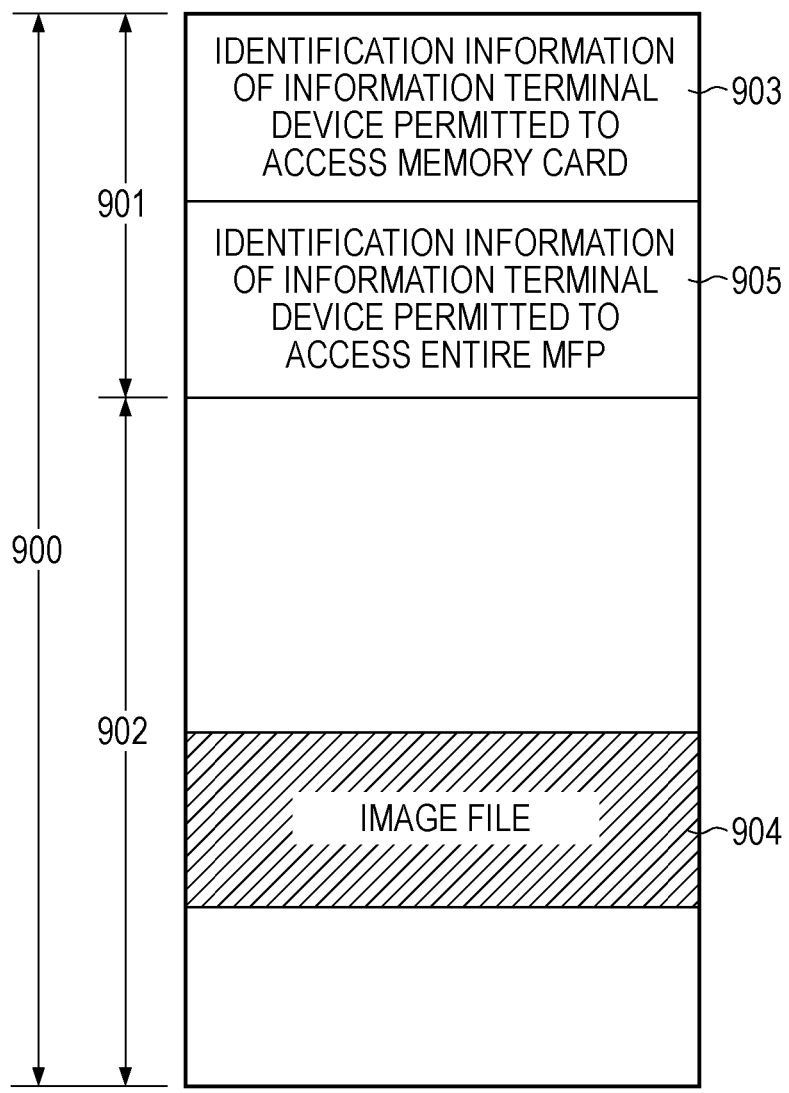
FIG. 7 schematically illustrates storage areas of a memory card according to a second exemplary embodiment.

FIG. 7 illustrates a memory card 104 according to the present embodiment. In FIG. 7, an entire area 900 of the memory card 104 includes areas 901 to 904. The areas 901 to 904 are similar to the areas 801 to 804 in the first embodiment illustrated in FIG. 5, and thus the description thereof will be omitted herein.

The specific area 901 illustrated in FIG. 7 is permitted to write in a specific manner, similar to the first embodiment. In the specific area 901, terminal device identification information 903 of an information terminal device permitted to access the memory card 104 has been stored beforehand in the specific manner.

The specific area 901 has also stored, in the specific manner, terminal device identification information 905 such as a MAC address which identifies an information terminal device permitted to access the entire MFP 100 with the memory card 104 inserted therein. An information terminal device corresponding to identification information contained in the terminal device identification information 903 may not access to the specific area 901 of the memory card 104.

—Access Control to Memory Card—

Figure 8:
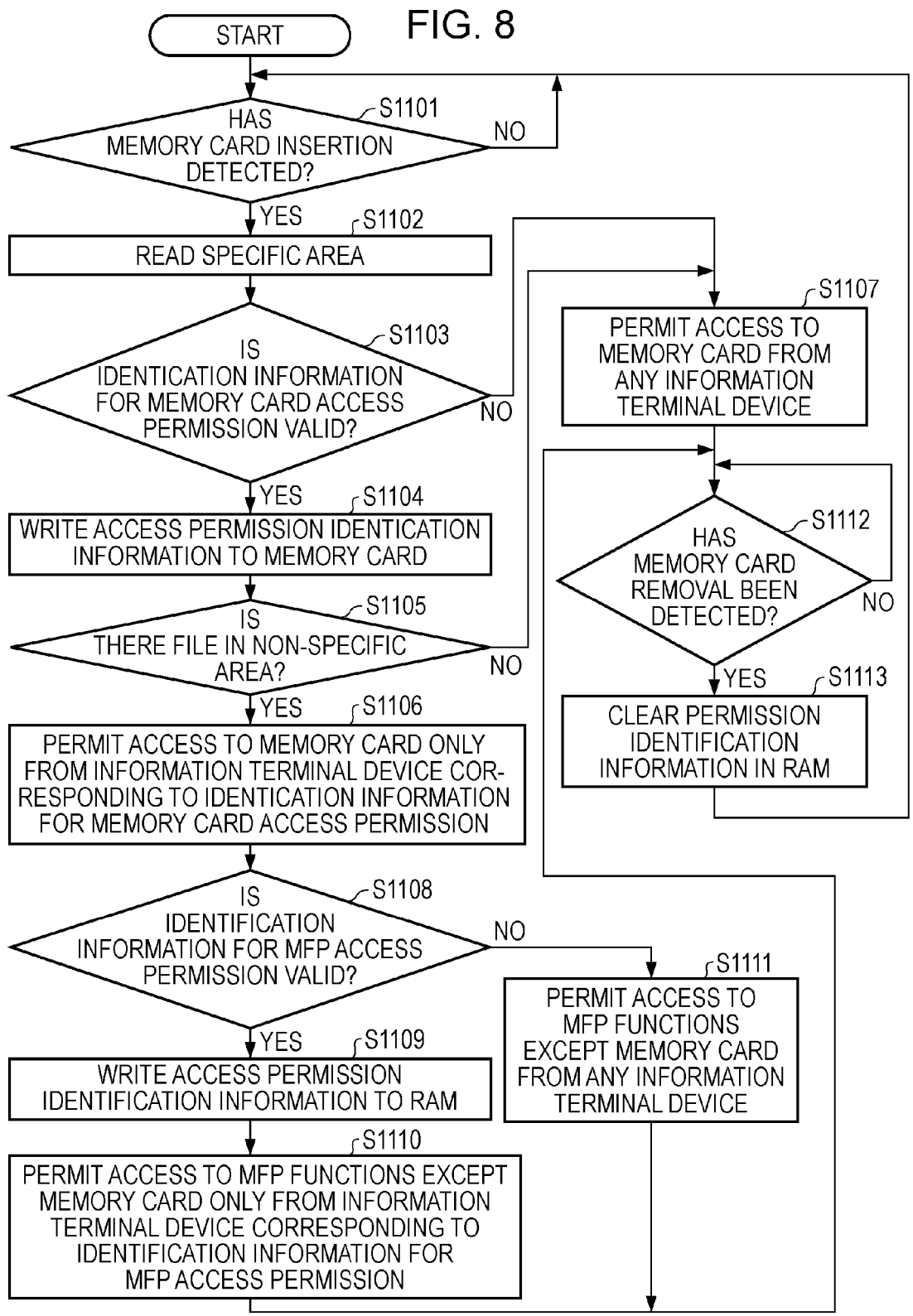
FIG. 8 is a flowchart illustrating a processing procedure of access control to a memory card according to the second exemplary embodiment.

FIG. 8 is a flowchart illustrating a processing procedure of access control to a memory card according to the present embodiment. In FIG. 8, the processing of steps S1101 through S1107 is similar to the processing of steps S1001 through S1007 of the first embodiment illustrated in FIG. 6, and thus the description thereof will be omitted herein.

In the present embodiment, the specific area 901 of the memory card 104 is read at step S1102 and the validity of terminal device identification information 903 is determined at step S1103. Then, at step S1108, the validity of terminal device identification information 905 in the specific area 901, which indicates a terminal device permitted to access the entire MFP 100, is also determined.

The determination of the validity/invalidity of the terminal device identification information 905 may be performed in the same manner as in the case of the determination performed in step S1102 in the first embodiment. The determination of the validity/invalidity of the terminal device identification information 905 in step S1108 is performed if the terminal device identification information 903 has been determined to be valid in step S1103 and also if it has been determined in step 1105 that a file is stored in the non-specific area 902.

If it is determined in step S1108 that the terminal device identification information 905 indicating a terminal device permitted to access to the entire MFP 100 is valid (YES, in Step S1108), the terminal device identification information 905 is written to a second predetermined area of the RAM 115 at step S1109. Based on the terminal device identification information 905 stored in an apparatus access permission information retaining section of the second predetermined area of the RAM 115, a terminal device to be permitted to access the MFP 100 is determined. More specifically, at step S1110, the network communication unit 110 performs control so that only an information terminal device corresponding to the identification information contained in the terminal device identification information 905 is permitted to use services provided by the MFP 100, except the memory card 104.

On the other hand, if it is determined in step S1108 that the terminal device identification information 905 is not valid (NO, in step S1108), the network communication unit 110 performs control so that any information terminal device can receive all services of the MFP 100, except the memory card 104, at step S1111.

Then, if the memory card insertion portion 103 detects that the memory card 104 has been removed (YES, in step S1112), the first and second predetermined areas of the RAM 115 having the data stored in the processing of step S1104 and S1109 is cleared and initialized at step S1113. Consequently, the MFP 100 is returned to a state it was in before the memory card 104 was inserted.

As described above, according to the present embodiment, when the terminal device identification information 903 is valid and a file is stored in the non-specific area 902, only an information terminal device corresponding to the terminal device identification information 903 is permitted to access the memory card 104. Further, if the terminal device identification information 905 is also valid, only an information terminal device corresponding to the terminal device identification information 905 can use the functions of the MFP 100, other than the storage function based on the memory card 104, such as the printer function and the scanner function. In addition, in the present embodiment, the terminal device identification information 903 and the terminal device identification information 905 stored in the memory card 104 may be stored as a common file or logically different files. In the example of FIG. 7, the terminal device identification information 903 and the terminal device identification information 905 are stored in the specific area 901 as different files. However, the terminal device identification information in the present embodiment is not limited to this example. For example, it can also be configured such that terminal device identification information is stored in the specific area 901 as one file, and information indicating whether a corresponding information terminal device is permitted to access to a memory card or to the MFP 100 can be added to individual pieces of identification information in the file.

In the following, a third exemplary embodiment of the present invention will be described. The third exemplary embodiment employs a system configuration similar to that employed in the first exemplary embodiment, and thus the description thereof will be omitted herein. In the second exemplary embodiment described above, when the access-permitted terminal information for memory card is invalid or when no file is stored in a non-specific area of a memory card, any terminal device is permitted to access to the memory card. In the third exemplary embodiment, control is performed so that any terminal device is permitted to access the functions of an MFP, other than the memory card, when the access-permitted terminal information for memory card is invalid or when no file is stored in a non-specific area of a memory card.

—Access Control to Memory Card—

Figure 9:
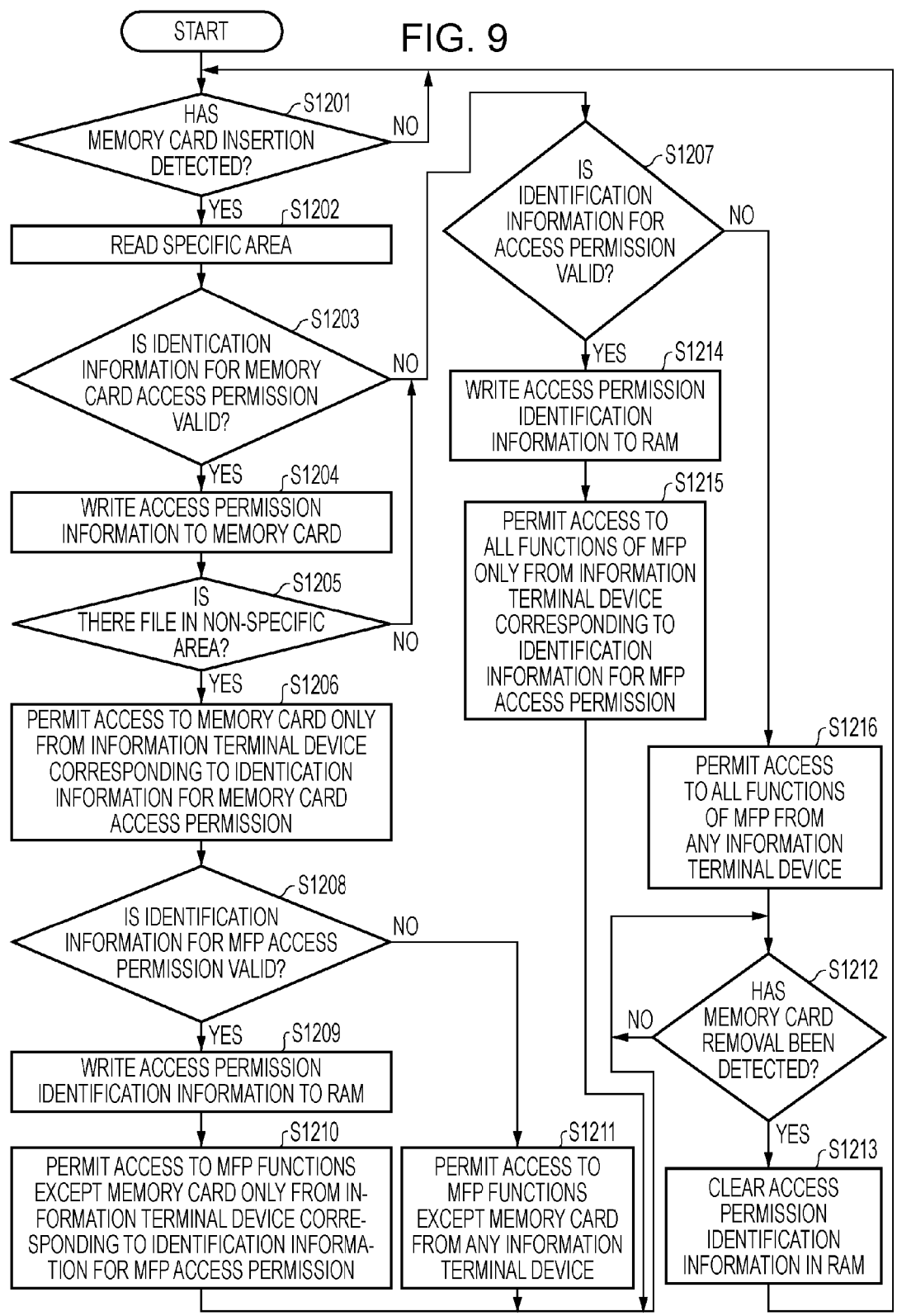
FIG. 9 is a flowchart illustrating a processing procedure of access control to a memory card according to a third exemplary embodiment.

FIG. 9 is a flowchart illustrating a processing procedure of access control to a memory card according to the present embodiment. In FIG. 9, the processing of steps S1201 through S1206 and the processing of steps S1208 through S1213 are similar to the processing of steps S1101 through S1106 and the processing of steps S1108 to S1113, respectively, illustrated in FIG. 8 in the second embodiment, and thus the description thereof will be omitted herein.

In the present embodiment, when the terminal device identification information 903 of a terminal device permitted to access the memory card 104 illustrated in FIG. 7 is invalid or when no file is stored in the non-specific area 902 of the memory card 104, more appropriate access restriction is applied.

In FIG. 9, when it is determined that the terminal device identification information 903 indicating a terminal device permitted to access the memory card 104 is invalid (NO, in Step S1203), it is determined whether the terminal device identification information 905 indicating a terminal device permitted to access the MFP 100 is valid at step S1207. Similarly, if it is determined that no file is stored in the non-specific area 902 (NO, in step S1205), it is also determined whether the terminal device identification information 905 indicating a terminal device permitted to access the MFP 100 is valid at step S1207.

If it is determined that the terminal device identification information 905 is valid (YES, in step S1207), the terminal device identification information 905 is written to a third predetermined area in the RAM 115 at step S1214. Thus, the network communication unit 110 performs control so that only an information terminal device corresponding to the identification information contained in the terminal device identification information 905 stored in the third predetermined area of the RAM 115 can access all the functions of the MFP 100 including the memory card 104 at step S1215. Consequently, only an information terminal device corresponding to the identification information contained in the terminal device identification information 905 stored in the third predetermined area of the RAM 115 can receive all services provided by the MFP 100.

On the other hand, if it is determined in step S1207 that the terminal device identification information 905 is invalid (NO, in step S1207), the network communication unit 110 performs control so that any information terminal device can access all functions of the MFP 100 at step S1216.

Then, the memory card insertion portion 103 detects that the memory card 104 has been removed (YES, in step S1212), and the first to third predetermined areas of the RAM 115 are cleared at step S1213. Thus, the MFP 100 is returned to the state it was in before the memory card 104 was inserted.

Note that although similar determination processing is performed in step S1207 and step S1208, the processing following a positive determination in each of these steps is different. This is because the processing preceding each of these steps is different.

Specifically, the processing proceeds to step S1207 when the terminal device identification information 903 is not valid or when it is determined that no file is stored in the non-specific area 902. In such a case, it is determined that no file to be protected or valid information for access restriction is stored in the memory card 104. Thus, it is permissible that an information terminal device corresponding to the identification information contained in the terminal device identification information 905 uses all functions of the MFP 100, including the storage function based on the memory card 104.

On the other hand, the processing proceeds to step S1208 when the terminal device identification information 903 is valid and when a file is stored in the non-specific area 902. This indicates that a file to be protected and valid information for access restriction are present in the memory card 104, and thus information terminal devices permitted to access the storage function of the memory card 104 should be limited to those corresponding to the terminal device identification information 903. Accordingly, when the result of step S1208 is positive, only the information terminal device corresponding to the terminal device identification information 903 is permitted to access the memory card 104 (step S1206). Then, the information terminal device corresponding to the identification information contained in the terminal device identification information 905 is permitted to access all the functions of the MFP 100, except the storage function based on the memory card 104 (step S1210).

As in the case of the processing following a positive result in steps S1207 and S1208, the processing following a negative result in steps S1207 and S1208 are also different. This too is a result of the processing preceding steps S1207 and S1208 are different.

Thus, according to the present embodiment, with the same terminal device identification information 905 of the memory card 104, different processing can be performed in accordance with the terminal device identification information 903 and a file storage state of the memory card 104.

In steps S1209 and S1214, the terminal device identification information 905 is written to the second and third predetermined area of the RAM 115, respectively, as described above. However, it is also possible that the terminal device identification information 905 is written to the second predetermined area of the RAM 115 in both steps S1209 and S1214, and values for distinguishing these processing steps are added so that the same processing result is obtained.

As described above, according to the present embodiment, even when the terminal device identification information 903 is not valid or when no file is stored in the non-specific area 902, the following processing procedure of access control is performed. Specifically, if the terminal device identification information 905 is valid, access control is executed so that only an information terminal device corresponding to the terminal device identification information 905 is permitted to access all the functions of the MFP 100, such as the printer function, the scanner function, and the storage functions based on the memory card 104 via the network 310.

In the following, a fourth exemplary embodiment of the present invention will be described. The fourth exemplary embodiment employs a system configuration similar to that employed in the first exemplary embodiment, and thus the description thereof will be omitted herein. In the third exemplary embodiment described above, when information on a terminal device permitted to access the MFP 100 is invalid, every terminal device can access all the functions of the MFP 100 or all the functions of the MFP 100 except the storage function based on the memory card 104.

In the fourth exemplary embodiment, when information on a terminal device permitted to access the MFP 100 is invalid, access control is performed in accordance with restriction information set beforehand in the body of the MFP 100, in addition to the terminal device identification information 903 and terminal device identification information 905 stored in the memory card 104. This access restriction information in the MFP 100 may be set through the operation panel 400 of the MFP 100 of the information terminal device 200 using utility software.

—Access Control to Memory Card—

Figure 10:
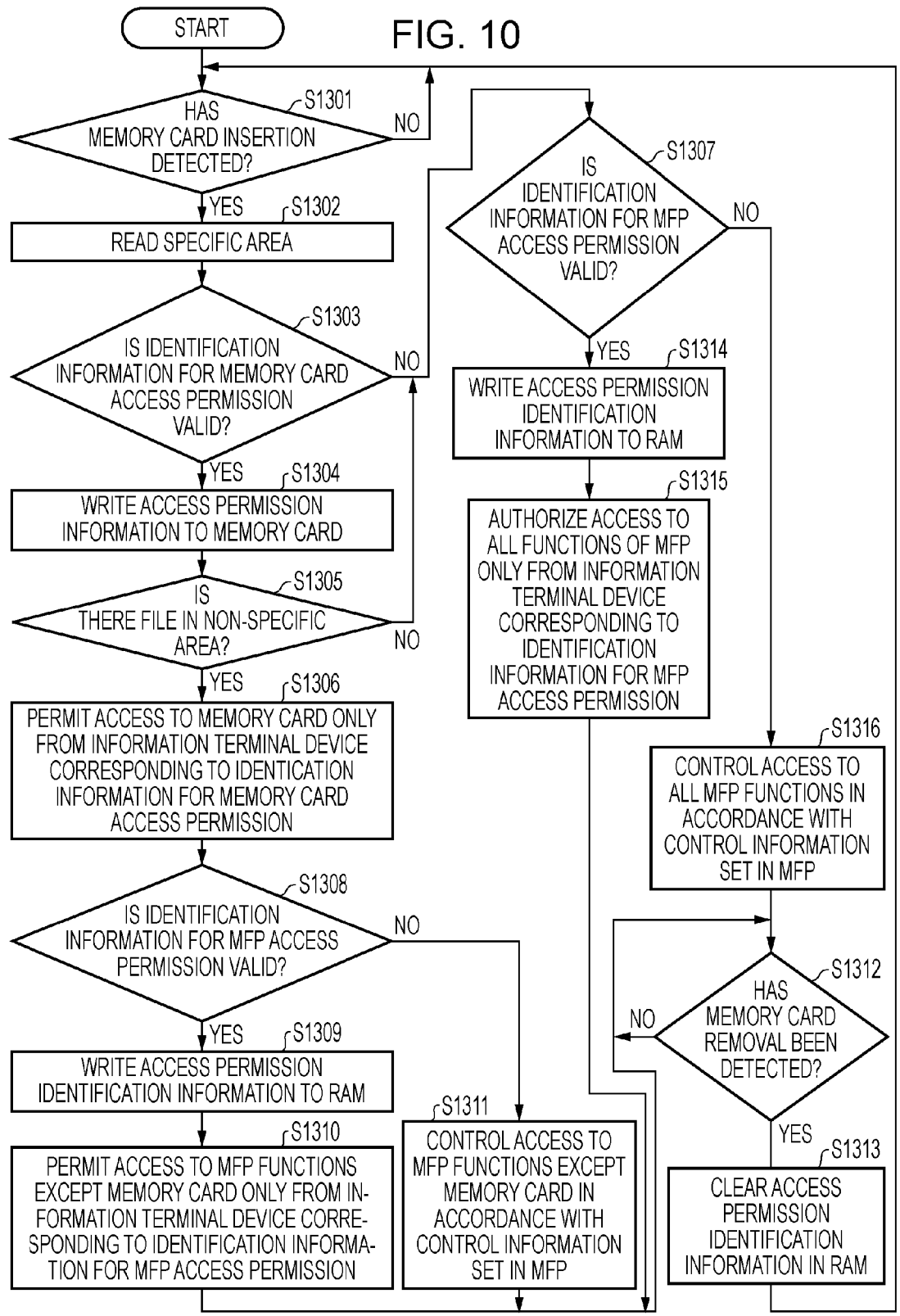
FIG. 10 is a flowchart illustrating a processing procedure of access control to a memory card according to a fourth exemplary embodiment.

FIG. 10 is a flowchart illustrating a processing procedure of access control applied to a memory card according to the present embodiment. In FIG. 10, the processing of steps S1301 through S1310 and the processing of steps S1312 through S1315 are similar to the processing of steps S1201 through S1210 and the processing of steps S1212 through S1215, respectively, in the third exemplary embodiment illustrated in FIG. 9, and thus the description thereof will be omitted herein. That is, the present embodiment features the processing of step S1311 and the processing of step S1316.

In the present embodiment, when the terminal device identification information 903 is valid (YES in step S1303) and if a file is stored in the non-specific area 902 (YES in step S1305), the processing procedure proceeds to step S1311 if the terminal device identification information 905 is invalid (NO, in step S1308). At Step S1311, control is performed so that only an information terminal device corresponding to terminal device identification information registered in the MFP 100 as access restriction information is permitted to access all the functions of the MFP 100, except the storage function based on the memory card 104.

On the other hand, if the terminal device identification information 903 is invalid (NO, in step S1303) or no file is stored in the non-specific area 902 (NO, in step S1305), the processing proceeds to step S1316 if the terminal device identification information 905 is invalid (NO in step S1307). At step S1316, control is performed so that only an information terminal device corresponding to the terminal identification information registered in the MFP 100 as the access restriction information is permitted to access all the functions of the MFP 100, including the storage function based on the memory card 104.

In the present embodiment, the terminal device identification information 905 of the memory card 104 is given priority over the access restriction information set in the MFP 100. However, the access restriction information may be given higher priority than the terminal device identification information 905.

In addition, even when the terminal device identification information 905 of the memory card 104 is valid, access may be prohibited based on the access restriction information set in the MFP 100. In this case, terminal device identification information obtained by ORing the terminal device identification information 905 and the terminal device identification information set in the MFP 100 is used for identifying an information terminal device permitted to access the MFP 100. In this case, at step S1310, control is performed so that only an information terminal device corresponding to the terminal device identification information 905 or to the access restriction information set in the MFP 100 is permitted to access all the functions of the MFP 100, except the storage function based on the memory card 104.

Alternatively, the AND of the terminal device identification information 905 and the terminal device identification information set in the MFP 100 is set as terminal device identification information of an information terminal device permitted to access the MFP 100. In this case, at step S1310, control is performed so that only an information terminal device corresponding to both the terminal device identification information 905 and the terminal device identification information registered in the MFP 100 is permitted to access all the functions of the MFP 100, except the storage functions based on the memory card 104.

As described above, according to the present embodiment, access restriction information set in the MFP 100, as well as the terminal device identification information stored in the memory card 104, can be used effectively.

In the following, a fifth exemplary embodiment according to the present invention will be described. The fifth exemplary embodiment employs a system configuration similar to that employed in the first exemplary embodiment, and thus the description thereof will be omitted herein. In the first exemplary embodiment described above, information on an information terminal device permitted to access a memory card is stored beforehand in the memory card. In the fifth exemplary embodiment, an access-permitted terminal device for the memory card is set by a user and the set device information is retained in the MFP.

—Access Control to Memory Card—

Figure 11:
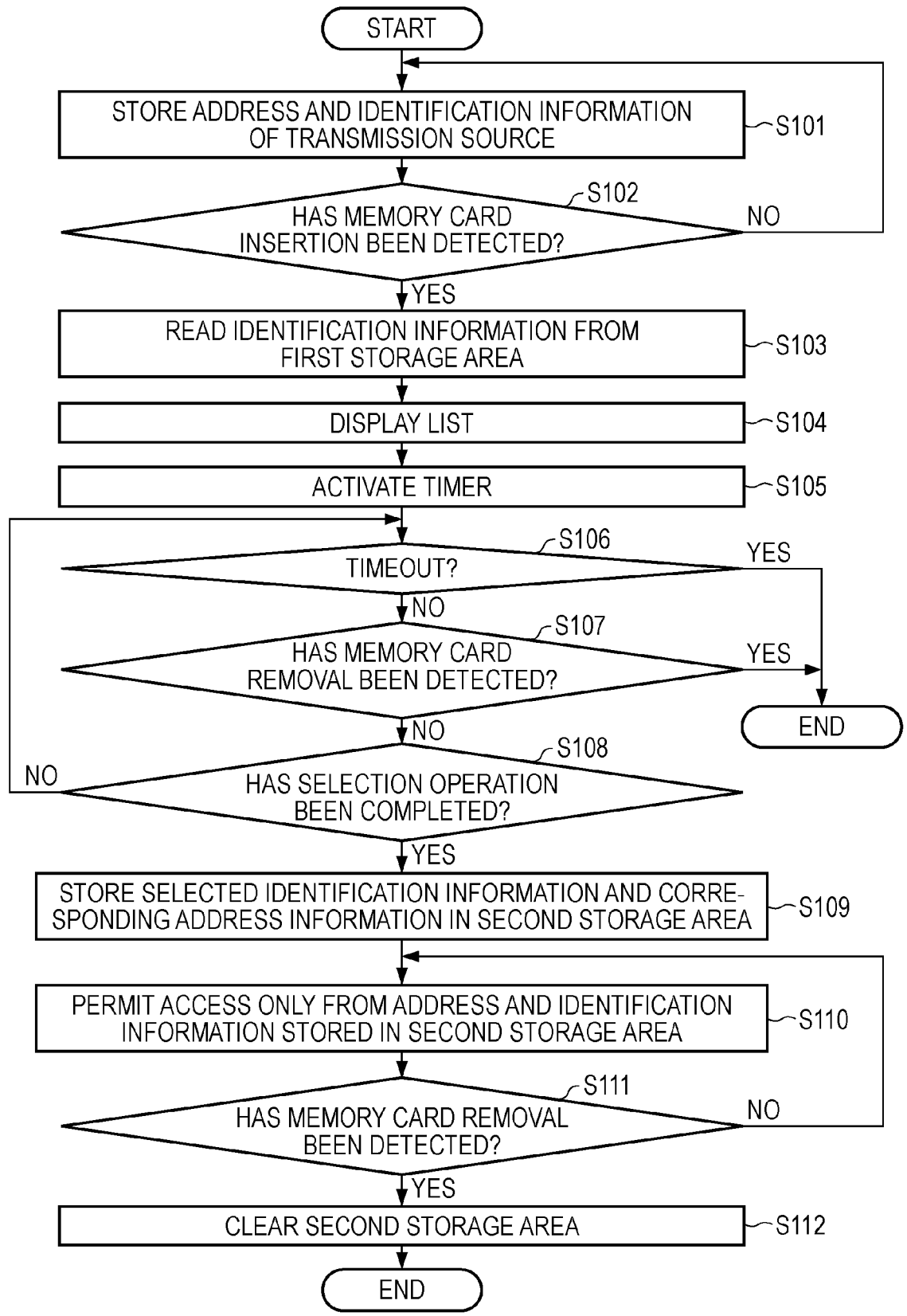
FIG. 11 is a flowchart illustrating a processing procedure of access control to a memory card according to a fifth exemplary embodiment.

FIG. 11 is a flowchart illustrating a processing procedure of access control applied to a memory card according to the present embodiment.

At step S101, the network communication unit 110 or the central control unit 105 in the MFP 100 stores an external device, such as an information terminal device, which has accessed the MFP 100 via the network 310. Specifically, address information of a transmission source of a received specific packet and identification information such as a computer name are stored in a specific area of the work memory 107 or a first storage area of the flash memory 112. With this arrangement, the address information and identification information of an information terminal device which has accessed the MFP 100 can be retained.

When the address information, etc. is stored in the work memory 107, the address information is cleared when the power of the MFP 100 is turned off. Therefore, the address information to be stored in the work memory 107 is limited to that of an information terminal device which accesses the MFP 100 while the power of the MFP 100 is turned on. On the other hand, when the address information, etc. is stored in the first storage area of the flash memory 112, the information is not erased even after the power of the MFP 100 is turned off. Therefore, both the work memory 107 and the flash memory 112 may be used such that, for example, the address information, etc. may be temporarily stored in the work memory 107 and the address information is transferred to the flash memory 112 at predetermined time intervals. In the following description, the first storage area of the flash memory 112 is used to store the address information, etc. in the processing of step S101.

The transmission source information of external devices that have accessed the MFP 100 is collected in the following process. For example, transmission source information can be collected from PC information registration request packets transmitted from individual information terminal devices to implement a push-scan function. In addition, it is also possible to collect the transmission source information based on an inquiry request packet periodically transmitted from each information terminal device for inquiring if a push-scan operation intended for the information terminal device has been performed on the MFP 100.

Further, transmission source information may be based on packet transmitted for using a printing service, a packet transmitted for using the pull-scan service, a packet used for performing network setting of MFP 100 and other settings from the information terminal device 200 or the information terminal device 300. Moreover, a packet for requesting status information as to whether printer supplies of the MFP 100, such as ink is remained for example, may be used to collect the transmission source information.

Figures 12, 13:
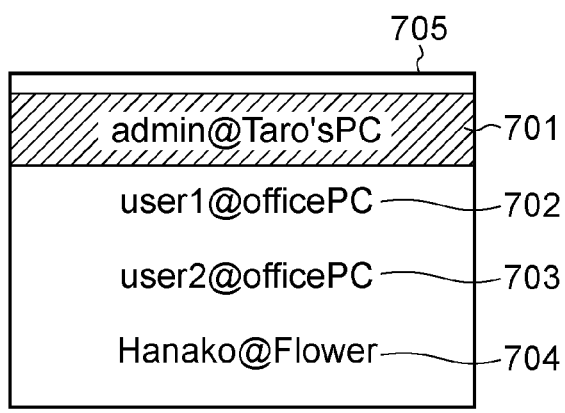
FIG. 12 illustrates an example of identification information of information terminal devices stored in a flash memory according to the fifth exemplary embodiment.
FIG. 13 illustrates an example of display of a list of information terminal devices according to the fifth exemplary embodiment.

FIG. 12 illustrates examples of address information and identification information of an information terminal device stored in a first storage area 600 of the flash memory 112. The first storage area 600 illustrated in FIG. 12 includes a computer name storage area 601 in which computer names and login names are stored. These computer names and login names have been collected based on the PC registration request packets, etc., which the MFP 100 received from information terminal devices. The first storage area 600 also includes an address storage area 602 in which transmission source IP addresses of the received PC registration request packets, etc., which the MFP 100 received from the information terminal devices, are stored to be associated with the data in the computer name storage area 601. Thus, computer name fields and address fields are associated with each other for each information terminal device. For example, the IP address of an information terminal device indicated in a computer name field 603 is stored in the address field 604.

In the data stored in the computer name storage area 601, a login name is written before the character "@", and a computer name is written after the character "@". For example, the data stored in the computer name field 603 indicates that an information terminal device named "Taro'sPC" is used by a user whose login name is "admin" and the IP address of the information terminal device is "192.168.1.101". Similar arrangement is applied to the computer name field 605 and address field 606, the computer name field 607 and address field 608, and the computer name field 609 and address field 610.

In the address storage area 602 illustrated in FIG. 12, an identical IP address "192.168.1.102" is stored in the address fields 606 and 608. This indicates that MFP 100 received PC registration request packets, etc. while an information terminal device named "officePC" was used with a login name "user1" and while the same information terminal device was used with a login name "user2", i.e., the same information terminal device is used by two users.

Referring back to FIG. 11, when address information, etc. of the external information terminal devices that have accessed the MFP 100 are stored, the MFP 100 detects that the memory card 104 has been inserted in the memory card insertion portion 103 at step S102. When the insertion of the memory card 104 is detected, at step S103, the MFP 100 reads the address information and the identification information of the information terminal devices stored in step S101 and displays the read information on the liquid crystal display 401 in the form of a list at step S104.

FIG. 13 illustrates an example of such a list. The list illustrated in FIG. 13 corresponds to the information terminal devices indicated in FIG. 12. As the content of display, the login names and computer names stored in the computer name fields 603, 605, 607, and 609, rather than the IP addresses stored in the address fields 604, 606, 608, and 610, facilitate the indication of the information terminal devices. Thus, in FIG. 13, the content of the computer name fields 603, 605, 607, and 609 is displayed as terminal information 701, 702, 703, and 704. In this display a cursor 705 is provided for indicating a selection state of the terminal information. This cursor 705 can be moved up and down using the arrow key 410. In the example of the list display illustrated in FIG. 13, the cursor 705 is superimposed on the terminal information 701, indicating that the IP address information in the address field 604 is selected.

The computer name indicated in the terminal information 702 and 703 is "officePC", and thus the same IP address is indicated in the address fields 606 and 608. This indicates that two users have used the same computer named "officePC" using the login names "user1" and "user2", and these users accessed the MFP 100 while operating the computer. In the example of FIG. 13, even the same computer may be permitted or prohibited to access the MFP 100 depending on the login name.

Referring back to FIG. 11, when the above list is displayed, the central control unit 105 activates the timer 114 to start measuring a first predetermined time period at step S105. At step S108, the central control unit 105 determines whether the user has completed an operation for selecting an information terminal device to be permitted to access the memory card 104 before the first predetermined time period elapses, i.e., before timeout, (NO, in step S106). The memory card 104 remains inserted to the MFP 100 during the above determination processing.

Now, details of the operation for selecting an access-permitted terminal device of step S108 will be described. A user places the cursor 705 on terminal information desired to be selected using the arrow key 410 while viewing the list illustrated in FIG. 13 and depresses the select key 412. As a result, the terminal information indicated by the cursor 705 is selected as an access-permitted terminal device. For example, when the select key 412 is depressed while the cursor 705 is placed on the terminal information 702, the following selection is made.

Specifically, the above selection indicates that access to the memory card 104 from the information terminal device named "officePC" is permitted while it is used with the login name "user1". When another key such as the memory card key 405 is depressed before the depression of the select key 412, the selection operation is terminated. To select a plurality of information terminal devices as access-permitted terminals, it is necessary to move the cursor 705 to the indications of the terminal information and depress the select key 412 before depressing the memory card key 405. Thus, by depressing the memory card key 405 after placing the cursor 705 on the indications of a plurality of desired pieces of identification information and depressing the select key 412, a plurality of desired information terminal devices can be set as access-permitted terminals.

Referring back to FIG. 11, if it is determined in step S108 that the operation for selecting an access-permitted terminals has been completed with the depression of the memory card key 405 by the user, the terminal information and the address information of the selected information terminal device are stored in a second storage area of the flash memory 112 at step S109. At this time, the list displayed on the liquid crystal display 401 is deleted, and the MFP 100 is returned to the state it was in before the insertion of the memory card 104 was detected in step S102. With this arrangement, the selection setting of access-permitted terminal can be limited to only one time and erroneous resetting of access-permitted terminal can be prevented.

In the processing of step 110 and thereafter, the MFP 100 permits access to the memory card 104 only from an information terminal device having the computer name and login name and the corresponding IP address information stored in the second storage area in the flash memory 112. This access permission is maintained while the memory card 104 is inserted in the MFP 100 (NO, in step S111). When an automatic allocation function according to DHCP (dynamic host configuration protocol) is used, the stored IP address may be changed. Thus, a failure may occur if access control is performed using fixed IP addresses.

For example, a device corresponding to an IP address may be different from the device which was originally set as corresponding to the IP address. In addition, a device corresponding to the IP address may no longer exist. Thus, it can be configured such that the IP address is used to obtain the MAC address of the information terminal device corresponding to the IP address using ARP (address resolution protocol) packets, and the corresponding computer name and login name are checked so that corresponding information terminal device is permitted to access the memory card 104.

When the first predetermined time period elapses before the selection operation of step S108 is completed (YES, in step S106), the information displayed on the liquid crystal display illustrated in FIG. 13 may be erased or changed to another information. That is, the selection operation of access-permitted terminal for the memory card 104 is not allowed. Thus, a change in setting of the access-permitted terminals is prohibited after the first predetermined time period elapses. The change is prohibited also in the case where the memory card insertion portion 103 detects the removal of the memory card 104 (YES, in step S107).

When the memory card insertion portion 103 detects the removal of the memory card 104 after the processing of Step S110 (YES, in step S111), the central control unit 105 clears the second area of the flash memory 112 at step S112. Thus, the MFP 100 is returned to the state it was in before the insertion of the memory card 104 was detected in step S102. Then, if the memory card insertion portion 103 detects another insertion of the memory card 104 or another memory card, the processing of step S102 and the following processing will be repeated.

The memory card insertion portion 103 may detect that the memory card 104 is inserted during activation processing of the MFP 100 in response to turn-on of the power of the MFP 100. In such a case, a list is displayed similar to the processing of step S104 so that a selection operation for selecting an access-permitted terminal similar to the processing of step S108 can be enabled.

However, when the selection operation is enabled every time the power of the MFP 100 is turned on, the access restriction setting may be changed every time the power of the MFP 100 is turned on/off. To address this problem, it can be configured such that the list is not displayed at the time of turn-on of the power, but that the list is displayed when insertion of the memory card 104 is detected while the power of the MFP 100 is ON. With this arrangement, the above problem is resolved and an access-permitted terminal can be set with increased certainty.

In the selection of an access-permitted terminal using the list illustrated in FIG. 13, an information terminal device permitted only to read data from the memory card 104 may be selected or an information terminal device permitted to read and write data from and to the memory card 104 may be selected. Such detailed selection permits setting in which, for example, reading is permitted from many information terminal devices and writing is permitted from only a few information terminal devices. This increases the flexibility of setting.

With respect to the present embodiment, it is also possible that the list display of step S104 and the selection of an access-permitted terminal of step S108 can be carried out using utility software. More specifically, by executing the utility software in an information terminal device, setting of access-permitted terminal using more advanced display functions and operation functions of the MFP 100 can be realized.

In particular, when the MFP 100 is located in a location relatively close to the information terminal device used by a user, insertion of the memory card 104 allows the user to perform the selection operation using a list displayed on the user's information terminal device. For example, when the user desires to select the user's information terminal device as an access-permitted terminal, the user is allowed to perform the selection while checking the terminal information of the user's information terminal device. Thus, selection without error can be realized. In addition, the list display and selection operations using an information terminal device is effective especially in a case where a memory card is inserted to a peripheral device without a display.

As described above, according to the present embodiment, when the memory card 104 is inserted in the MFP 100, an information terminal device permitted to access the memory card 104 can be set by a user. This setting is allowed only during a predetermined time period after the insertion of the memory card 104. In addition, when the memory card 104 is removed from the MFP 100, the setting is cleared, so that the access control can be easily returned to the initial state. Further, additional registration or a change in access-permitted terminals can be made by insertion and removal of the memory card 104.

The present invention illustrated in accordance with the individual exemplary embodiment described above is applicable not only to MFPs having network communication functions but also to single-function devices such as printers, scanners, and storage devices having memory card insertion portions. The present invention is also applicable to network connectable household appliances such as AV apparatuses, home servers, and digital cameras. In addition, the present invention can be applied to storage media (removable memory media) instead of memory cards, such as DVD disks and magnetic tapes, and to peripheral devices in which recording media or new media can be inserted.

The present invention may be implemented as a system, apparatus, method, program, a storage medium (recording medium), etc. More specifically, the present invention may be applied to a system including a plurality of devices (e.g., a host computer, an interface device, an image pickup apparatus, and a Web application) or to single device apparatuses.

The present invention is also achieved by supplying a software program for realizing the functions of the above-described embodiments to a system or apparatus directly or from a remote place, and reading out and executing the supplied program code by the computer of the system or apparatus. The software program refers to a software program corresponding to each flowchart shown in the individual drawings.

Thus, the present invention can also be realized by program code installed in the computer to realize the functional processes of the present invention by the computer. That is, the computer program for implementing the function of the above-described exemplary embodiments may be encompassed in the present invention.

In this case, the present invention can take any program form such as object code, a program executed by an interpreter, script data supplied to an OS, as long as a program function is attained.

A recording medium for supplying the program includes a floppy disk, hard disk, optical disk, magneto-optical disk, MO, CD-ROM, CD-R, CD-RW, magnetic tape, nonvolatile memory card, ROM, and DVD (DVD-ROM and DVD-R).

The program can also be supplied by connecting a client computer to an Internet Web page via the browser of the client computer, and downloading the computer program of the present invention or a compressed file containing an automatic installation function from the Web page to a recording medium such as a hard disk. The program can also be realized by grouping program code which forms the program of the present invention into a plurality of files, and downloading the files from different Web pages. That is, the present invention also includes a WWW server which allows a plurality of users to download the program files for realizing the functional processes of the present invention by a computer.

The program of the present invention can also be encrypted, stored in a storage medium such as a CD-ROM, and distributed to the user. A user who satisfies predetermined conditions is prompted to download decryption key information from a Web page via the Internet. That is, the user executes the encrypted program by using the key information, and installs the program in the computer.

The functions of the above-described embodiments may be realized when the computer executes the readout program. Further, the functions of the above-described embodiments may be realized when an OS or the like running on the computer performs some or all of actual processes on the basis of the instructions of the program.

The functions of the above-described embodiments may also be realized when the program read out from the storage medium is written to the memory of a function expansion board inserted into the computer or the memory of a function expansion unit connected to the computer, and then the CPU of the function expansion board or function expansion unit performs part or all of actual processes on the basis of the instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-046294 filed Feb. 26, 2007, which is hereby incorporated by reference herein in its entirety.

What is claimed is:

1. A multifunction peripheral which can be connected to a network capable of connecting a plurality of terminal devices and to which a removable memory card is set, the multifunction peripheral comprising:
    an acquiring unit configured to acquire, when the removable memory card is set to the multifunction peripheral, identifying information for identifying at least one terminal device which is permitted to access the removable memory card set to the multifunction peripheral;
    a selecting unit configured to select at least one terminal device that is permitted to access the removable memory card which has been set to the multifunction peripheral via the network in accordance with the identifying information acquired by the acquiring unit; and
    a control unit configured to permit the terminal device selected by the selecting unit to access the removable memory card which has been set to the multifunction peripheral and to invalidate, if the set removable memory card is removed from the multifunction peripheral, the permission for the terminal device selected by the selecting unit to prevent the terminal device from accessing another removable memory card set to the multifunction peripheral.

2. The apparatus according to claim 1, further comprising a storing unit configured to store the identifying information indicating the terminal device, wherein the control unit invalidates the permission for the selected terminal device by clearing the information stored by the storing unit.

3. The apparatus according to claim 1, further comprising a presentation unit configured to present information indicating at least one terminal device which is permitted to access the removable memory card set to the multifunction peripheral, wherein the selecting unit selects, based on an user's selection, the at least one terminal device from the information presented by the presentation unit.

4. The apparatus according to claim 3, wherein the selecting unit allows the user's selection for selecting the at least one terminal device until a predetermined time period elapses since the removable memory card is set to the multifunction peripheral.

5. The apparatus according to claim 1, wherein the control unit permits the selected terminal device to read information stored in the set removable memory card but does not permit the selected terminal device to write information to the set removable memory card.

6. The apparatus according to claim 1, wherein the control unit permits the selected terminal device to read information stored in the set removable memory card and to write information to the set removable memory card.

7. A method for controlling a multifunction peripheral, the multifunction peripheral which can be connected to a plurality of terminal devices via a network and to which a removable memory card is set, the method comprising:
    acquiring, when the removable memory card is set to the apparatus multifunction peripheral, identifying information for identifying at least one terminal device which is permitted to access the removable memory card set to the multifunction peripheral;
    selecting at least one of the at least one terminal device that is permitted to access the removable memory card which has been set to the multifunction peripheral via the network in accordance with the acquired identifying information;
    permitting the selected terminal device to access the removable memory card which has been set to the multifunction peripheral; and
    invalidating, if the set removable memory card is removed from the multifunction peripheral, the permission for the selected terminal device to prevent the terminal device from accessing another removable memory card set to the multifunction peripheral.

8. A non-transitory computer-readable storage medium storing a computer-executable program, the computer-executable program causing a computer to execute the method of claim 7.

* * * * *